(12) United States Patent
Wolf et al.

(10) Patent No.: US 12,037,191 B2
(45) Date of Patent: Jul. 16, 2024

(54) AUTOMATED WAREHOUSE IMPROVEMENTS

(71) Applicant: Lineage Logistics, LLC, Irvine, CA (US)

(72) Inventors: Elliott Gerard Wolf, San Francisco, CA (US); Christoper Eckman, San Francisco, CA (US); Brian Gutschow, Blair, NE (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 18/308,730

(22) Filed: Apr. 28, 2023

(65) Prior Publication Data

US 2023/0331481 A1 Oct. 19, 2023

Related U.S. Application Data

(63) Continuation of application No. 17/080,645, filed on Oct. 26, 2020, now Pat. No. 11,807,455, which is a
(Continued)

(51) Int. Cl.
*B65G 1/04* (2006.01)
*B65G 1/137* (2006.01)
(Continued)

(52) U.S. Cl.
CPC ......... *B65G 1/0485* (2013.01); *B65G 1/1378* (2013.01); *F25D 13/06* (2013.01); *G06Q 10/08* (2013.01); *B65G 2203/0233* (2013.01)

(58) Field of Classification Search
CPC ............... B65G 1/0485; B65G 1/1378; B65G 2203/0233; F25D 13/06; G06Q 10/08
See application file for complete search history.

(56) References Cited

U.S. PATENT DOCUMENTS 3,093,252 A * 6/1963 Cahill ................. B65G 1/0485
414/626
3,434,604 A * 3/1969 Bartels ................ B65G 1/1378
414/281
(Continued)

FOREIGN PATENT DOCUMENTS

EP 1521194 4/2005

OTHER PUBLICATIONS

Brandão et al., "Bin Packing and Related Problems: General Arc-flow Formulation with Graph Compression," Technical Report Series: DCC-2013-08, Sep. 26, 2013, 29 pages.
(Continued)

*Primary Examiner* — Thomas Randazzo
(74) *Attorney, Agent, or Firm* — Barnes & Thornburg LLP

(57) ABSTRACT

This document generally describes warehousing systems that can, in certain instances, improve the efficiency of warehousing operations and improve utilization of available space in a warehousing facility. The warehousing system may be implemented in an automated warehouse, such as an automated cold-storage facility, that uses programmable equipment to automate tasks associated with warehousing operations, such as transporting inbound storage items to specified storage positions of storage racks in the warehouse and removing outbound storage items from storage so that they may be loaded onto trucks for delivery away from the warehouse.

20 Claims, 11 Drawing Sheets

Related U.S. Application Data continuation of application No. 16/354,647, filed on Mar. 15, 2019, now Pat. No. 10,815,058, which is a continuation of application No. 15/947,073, filed on Apr. 6, 2018, now Pat. No. 10,259,648.

(60) Provisional application No. 62/482,609, filed on Apr. 6, 2017.

(51) Int. Cl.
*F25D 13/06* (2006.01)
*G06Q 10/08* (2024.01)

(56) References Cited

U.S. PATENT DOCUMENTS

| | | | |
|---|---|---|---|
| 3,613,910 A * | 10/1971 | Weir | B65G 1/0485 |
| | | | 414/281 |
| 3,677,421 A | 7/1972 | Kintner | |
| 4,093,086 A * | 6/1978 | Lucas | B65G 1/0485 |
| | | | 414/283 |
| 5,953,234 A * | 9/1999 | Singer | B65G 1/1378 |
| | | | 700/214 |
| 6,450,751 B1 * | 9/2002 | Hollander | B65G 1/1378 |
| | | | 414/268 |
| 8,594,835 B2 | 11/2013 | Lert et al. | |
| 8,918,750 B1 | 12/2014 | Moffitt | |
| 9,262,681 B1 * | 2/2016 | Mishra | H04N 7/181 |
| 9,336,509 B1 * | 5/2016 | Arun Singhal | G06Q 10/087 |
| 9,776,794 B2 * | 10/2017 | Sullivan | B65G 1/0492 |
| 10,259,648 B2 * | 4/2019 | Wolf | B65G 1/0485 |
| 10,815,058 B2 | 10/2020 | Wolf et al. | |
| 11,807,455 B2 * | 11/2023 | Wolf | B65G 1/0485 |
| 2002/0178074 A1 * | 11/2002 | Bloom | G06Q 20/00 |
| | | | 705/26.81 |
| 2004/0215480 A1 * | 10/2004 | Kadaba | B07C 3/00 |
| | | | 705/333 |
| 2006/0020366 A1 * | 1/2006 | Bloom | G06Q 20/00 |
| | | | 700/226 |
| 2007/0134077 A1 * | 6/2007 | Laurin | B65G 1/0407 |
| | | | 414/276 |
| 2007/0156536 A1 | 7/2007 | Alfandary et al. | |
| 2011/0106295 A1 * | 5/2011 | Miranda | B65G 1/1378 |
| | | | 700/216 |
| 2012/0061338 A1 | 3/2012 | Willick et al. | |
| 2015/0178816 A1 * | 6/2015 | Zak | B65G 1/1378 |
| | | | 705/26.81 |
| 2017/0091704 A1 | 3/2017 | Wolf et al. | |
| 2017/0301004 A1 * | 10/2017 | Chirnomas | G06Q 20/12 |
| 2018/0154399 A1 * | 6/2018 | Wagner | B07C 5/38 |
| 2018/0225597 A1 * | 8/2018 | Hance | G06Q 10/06315 |
| 2018/0290831 A1 | 10/2018 | Wolf et al. | |

OTHER PUBLICATIONS

Gu et al., "Research on warehouse design and performance evaluation: A comprehensive review," European Journal of Operational Research, Jun. 2010, 203(3):539-549.

International Search Report and Written Opinion in International Application No. PCT/US2016/054551, dated Dec. 5, 2016, 12 pages.

International Search Report and Written Opinion in International Application No. PCTAJS2018/026427, dated Jul. 6, 2018, 12 pages.

Lee et al., "Optimal design of rack structure with modular cell in AS/RS," Int. J. Production Economics, Nov. 2005, 98(2):172-178.

Roodbergen et al., "A survey of literature on automated storage and retrieval systems," European Journal of Operational Research, Apr. 2009, 194(2):343-362.

* cited by examiner

AUTOMATED WAREHOUSE IMPROVEMENTS

CROSS-REFERENCE TO RELATED APPLICATIONS

This application is a continuation of U.S. application Ser. No. 17/080,645, filed on Oct. 26, 2020, which is a continuation of U.S. application Ser. No. 16/354,647, filed Mar. 15, 2019 and issued on Oct. 27, 2020 as U.S. Pat. No. 10,815, 058, which is a continuation of U.S. application Ser. No. 15/947,073, filed Apr. 6, 2018 and issued on Apr. 16, 2019 as U.S. Pat. No. 10,259,648, which claims the benefit of priority under 35 U.S.C. § 119(e) of U.S. Application Ser. No. 62/482,609, filed Apr. 6, 2017. Each of the aforementioned patent applications is hereby incorporated by reference in its entirety.

TECHNICAL FIELD

This document generally describes improvements to automated warehouse designs and systems for storing pallets and other physical goods.

BACKGROUND

Warehouses include warehouse racks to store pallets of goods (e.g., storage items). Pallets are generally flat transport structures that support goods in a stable manner and that also include structures that are adapted to fit forklifts and/or other devices/machines to move pallets. Stacked on top of pallets are packages of various products. The weight and volume stacked on a pallet varies, resulting in a mix of heights for a given inventory profile. Warehouses have been designed to permit forklifts to put and pull pallets from racks as needed.

Automated warehouses have also been designed. Automated warehouses include a variety of features to permit machines to automatically (without human direction) put and pull pallets from racks. Automated warehouses can include a variety of features, such as conveyor belts to transport pallets from a warehouse dock (where pallets are loaded and unloaded from trucks) to cranes that are designed to lift pallets to different rows on a warehouse rack. The racks can be equipped with carts on each row of the rack that are designed to carry pallets from the crane to a final storage location in the rack for the pallet.

SUMMARY

This document generally describes automated warehousing systems that can, in certain instances, improve the efficiency of warehousing operations and improve utilization of available space in a warehousing facility. The system may be implemented in an automated warehouse, such as an automated cold-storage facility, that uses programmable equipment to automate tasks associated with warehousing operations, such as transporting inbound storage items to specified storage positions of storage racks in the warehouse and removing outbound storage items from storage so that they may be loaded onto trucks for delivery away from the warehouse.

The warehousing system may be characterized by a set of parameters that define a layout and/or particular features of the system. For example, the parameters for a warehousing system may indicate a number of inbound-outbound conveyor modules that are to be provided in a docking area of the warehouse and how these modules are to be configured (e.g., total numbers and/or ratios of inbound conveyor lanes and outbound conveyor lanes per inbound-outbound conveyor module).

Additional parameters may define other aspects of the warehousing system, such as the configuration of a routing conveyor module that connects inbound-outbound conveyor modules to an automated shuttling subsystem for loading and removing storage items from the storage racks. In some implementations, the configuration and implementation of the warehousing system is determined so as to optimize one or more performance factors of the system. For example, a warehouse simulation computing system may evaluate performance metrics associated with different candidate configurations of warehousing systems, where the parameters of the candidate configurations differ at least partially from each other. A warehousing system may then be implemented according to the parameters of one of the candidate configurations that is determined to optimize the performance metrics of the warehouse.

By optimizing such performance metrics, the warehousing system may, in some implementations, increase throughput and efficiency of handling inbound and outbound storage items (e.g., reduce the time to pick or put a pallet in a storage location in the warehouse), decrease incidents of pallet "traffic jams" in which too many pallets are concurrently being routed along the same automated warehousing components (e.g., conveyors), increase redundancy to provide a viable and robust solution that will continue to provide high levels of efficiency even if one or more warehousing components go down (e.g., break, repair, maintenance), and/or provide a robust automated warehousing solution that is able to accommodate spikes in warehousing activity, which can result from the warehouse accommodating multiple different customers each with different storage profiles (e.g., pallet volume and size variation over a year) that, at points, can converge to create spikes in the demand on the automated warehousing components. Such improvements can be accomplished by the automated warehousing systems described throughout this document.

Some implementations of the subject matter disclosed herein include a warehousing system. The warehousing system may include a collection of components that are configured to be installed in a warehouse to facilitate the transfer of storage items (e.g., inventory) between a docking area of the warehouse and a storage area of the warehouse. The warehousing system may include one or more inbound-outbound conveyor modules configured to be installed in the docking area of the warehouse and a routing conveyor module configured to be installed in the docking area of the warehouse, the storage area of the warehouse, or both.

The inbound-outbound conveyor modules each include (i) a set of inbound conveyor lanes configured to carry inbound storage items to the docking area of the warehouse and (ii) a set of outbound conveyor lanes configured to carry outbound storage items that have been delivered from the docking area of the warehouse to pick-up positions in the docking area of the warehouse. All or some of the inbound-outbound conveyor module can be configured such that a total number of outbound conveyor lanes in the set of outbound conveyor lanes is greater than a total number of inbound conveyor lanes in the set of inbound conveyor lanes.

The routing conveyor module can include conveyors configured to direct (e.g., transport along a path of one or more conveyors) inbound storage items from inbound conveyor lanes to a rack shuttling subsystem located in the storage area of the warehouse. The routing conveyor module can further direct outbound storage items from the storage area of the warehouse to outbound conveyor lanes in the docking area of the warehouse.

These and other implementations can optionally include one or more of the following features.

The warehousing system can further include the automated rack shuttling subsystem. The automated rack shuttling subsystem can be configured to direct inbound storage items from the routing conveyor module to specified storage positions in the storage racks, e.g., by using robots and/or other equipment to lift, shuttle, and place the inbound storage items into the specified storage positions in the storage racks. The automated rack shuttling subsystem can further be configured to direct outbound storage items from the storage racks to the routing conveyor module, e.g., by using robots and/or other equipment to remove the storage item from its storage position in the storage racks, shuttle the storage item to the end of a row of storage racks, lower the storage item to a drop-off location of the routing conveyor module, and place the storage item at the drop-off location of the routing conveyor module for transport to an outbound conveyor lane. The warehousing system can be configured to reduce the number of shuttling subsystems, which can be expensive, in favor of increasing the number of other automated warehousing components, such as conveyors, which can be less expensive. For example, one or more multi-directional conveyor loops in the freezer connecting all inbound and outbound conveyors to the cranes (which connect to the rack shuttling subsystems) can be added to the warehouse, which can reduce the number of shuttling subsystems needed to achieve various performance metrics for the warehouse (e.g., time to put or pull a pallet in the racks). For instance, the ratio of the number of shuttle subsystems to doors (with conveyors) leading into and out of a freezer space within an automated warehouse can be reduced minimize the number of shuttle subsystems that are used per door, such as a ratio of 2:3, 1:2, 1:4, and/or other ratios.

The system can include multiple inbound-outbound conveyor modules configured to be installed in the docking area of the warehouse. In each inbound-outbound conveyor module, the total number of outbound conveyor lanes in the set of outbound conveyor lanes can be at least twice the total number of inbound conveyor lanes in the set of inbound conveyor lanes. The ratio of the total number of outbound conveyor lanes per inbound-outbound conveyor module can be at least twice the total number of inbound conveyor lanes per inbound-outbound conveyor module.

For at least one of the inbound-outbound conveyor modules, a ratio of the total number of outbound conveyor lanes in the set of outbound conveyor lanes to the total number of inbound conveyor lanes in the set of inbound conveyor lanes can be 9:2.

The warehousing system can include a total of three inbound-outbound conveyor modules, each inbound-outbound conveyor module having a total of nine outbound conveyor lanes and a total of two inbound conveyor lanes.

The warehousing system can include multiple inbound-outbound conveyor modules. The routing conveyor module can include one or more conveyors that connect the multiple inbound-outbound conveyor modules such that a given storage item can be continuously transferred within the storage area from any of the multiple inbound-outbound conveyor modules to another of the multiple inbound-outbound conveyor modules.

The docking area of the warehouse can be physically separated from the storage of the warehouse by one or more walls to substantially isolate the docking area from the storage area of the warehouse. The one or more walls can include a set of passages to permit transfer of storage items between the docking area and the storage area. In some implementations, the set of passages includes at least one passage for each inbound-outbound conveyor module. In some implementations, the set of passages includes at least one inbound-passage for each inbound-outbound conveyor module and at least one outbound passage for each inbound-outbound conveyor module. The set of conveyors in the routing conveyor module can be configured to pass through the wall via the set of passages such that outbound storage items carried by a conveyor in the routing conveyor module are directed to outbound lanes in a corresponding inbound-outbound conveyor module or are re-directed to outbound lanes in other inbound-outbound conveyor modules.

The docking area can include a set of transport bays. Each transport may is configured to receive a respective cargo trailer for outbound storage item deliveries or inbound storage item deliveries. A total number of outbound conveyor lanes among the set of outbound conveyor lanes in the one or more inbound-outbound conveyor modules can be greater than a total number of transport bays in the set of transport bays of the docking area. In some implementations, a ratio of the total number of outbound conveyor lanes in all of the inbound-outbound conveyor modules within the docking area to the total number of transport bays is at least 2:1.

In some implementations, for each inbound-outbound conveyor module, the set of inbound conveyor lanes and the set of outbound conveyor lanes of the module are configured to run parallel to each other across a respective portion of the docking area to form a cluster of inbound and outbound lanes. In some implementations, the cluster is configured to have a pair of inbound conveyor lanes provided at outermost positions of the cluster so as to flank the set of outbound conveyor lanes in the cluster.

For each inbound-outbound conveyor module, the inbound conveyor lanes and the outbound conveyor lanes of the module can all have substantially the same length and/or can extend to a specified lateral position of the docking area.

The warehousing system can further include one or more inbound storage item profiling stations that are configured to receive identification information of inbound storage items that are delivered to the warehouse and to register inbound storage items with a warehouse management computing system that e.g., provides inventory management services for the warehouse. In some implementations, the warehousing system can include multiple inbound-outbound conveyor modules and a respective inbound storage item profiling station for each inbound-outbound conveyor module.

The warehouse can be a cold-storage facility and the storage area of the warehouse can be a refrigerated storage area that maintains a temperature profile that is sufficient to keep storage items stored in the refrigerated storage area frozen. For example, the temperature of the storage area may be maintained below 32 degrees Fahrenheit, below 10 degrees Fahrenheit, below, 0 degrees Fahrenheit, below −10 degrees Fahrenheit, or below −25 degrees Fahrenheit depending on the requirements of the particular storage items that are stored in the area.

The warehousing system can further include a warehouse management computing system. The computing system can include one or more computers configured to control the routing area conveyor module to carry outbound storage items to specified inbound-outbound conveyor modules or to specified outbound conveyor lanes that are determined based on one or more optimization criteria. In some implementations, the one or more optimization criteria include a targeted distribution of outbound storage items, which are assigned to be loaded onto a same cargo trailer, among outbound conveyor lanes in a plurality of inbound-outbound conveyor modules.

At least one inbound-outbound conveyor module may be re-configurable so that inbound conveyor lanes or outbound conveyor lanes can be added or removed from the set of inbound conveyor lanes or outbound conveyor lanes, respectively.

The warehousing system can further include a warehouse management computing system that is configured to obtain a storage item profile that indicates a distribution of different types of storage items that are anticipated to be stored on storage racks in the storage area of the warehouse over a future period of time; determining, based at least on the storage item profile, a configuration of the one or more inbound-outbound conveyor modules that optimizes one or more criteria; and generating information for presentation to a user of the warehouse management computing system that represents the determined configuration of the one or more inbound-outbound conveyor modules.

The configuration of the one or more inbound-outbound conveyor modules determined by the warehouse management computing system can specify, for each inbound-outbound conveyor module, at least one of a total number of inbound conveyor lanes, a total number of outbound conveyor lanes, a length of the inbound conveyor lanes, a length of the outbound conveyor lanes, and a ratio of the total number of outbound conveyor lanes to the total number of inbound conveyor lanes.

The one or more criteria that the warehouse management computing system optimizes in determining the configuration of the one or more inbound-outbound conveyor modules can include at least one of a throughput of inbound storage items and a throughput of outbound storage items.

The routing conveyor module can include at least two conveyor lanes that are configured to be located in the storage area of the warehouse and oriented substantially parallel to a wall or other barrier that separates the docking area of the warehouse from the storage area of the warehouse. In some implementations, at least two conveyor lanes each configured to transport storage items to conveyor exchange locations or storage items pick-up locations.

The storage racks can include rows that are each arranged to hold storage items in respective storage positions in a set of storage positions that are dispersed in both a lateral direction and a vertical direction. The automated shuttle subsystem can be configured to transport storage items to or from each of the storage positions in at least one row of the plurality of rows of the storage racks.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
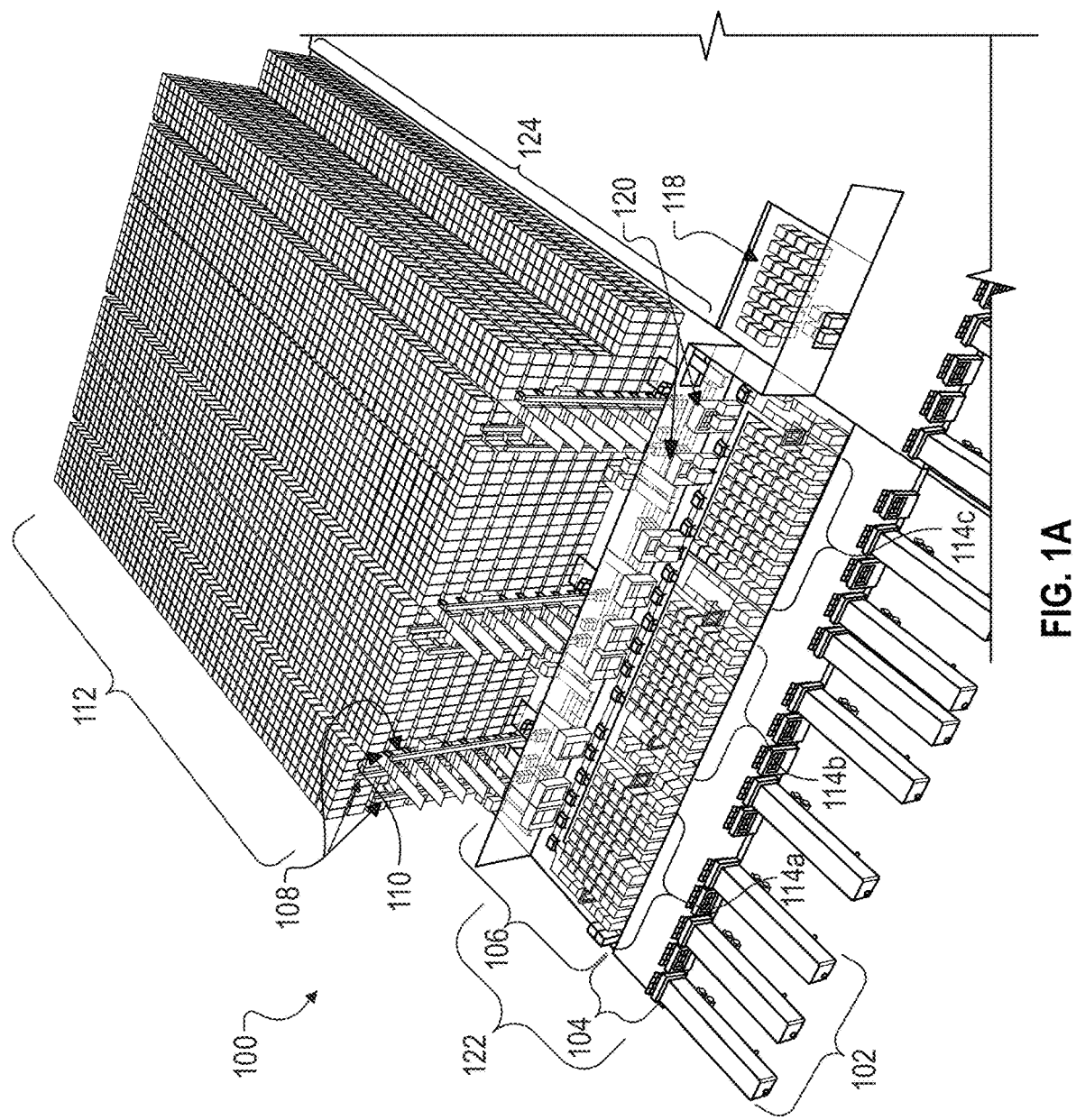
FIGS. 1A-1F depict several views of an automated warehouse. The automated warehouse includes a warehousing system installed in a facility to transport inbound storage items to storage in the warehouse and to transport outbound storage items to a truck/bay for delivery away from the warehouse.
Figure 1B:
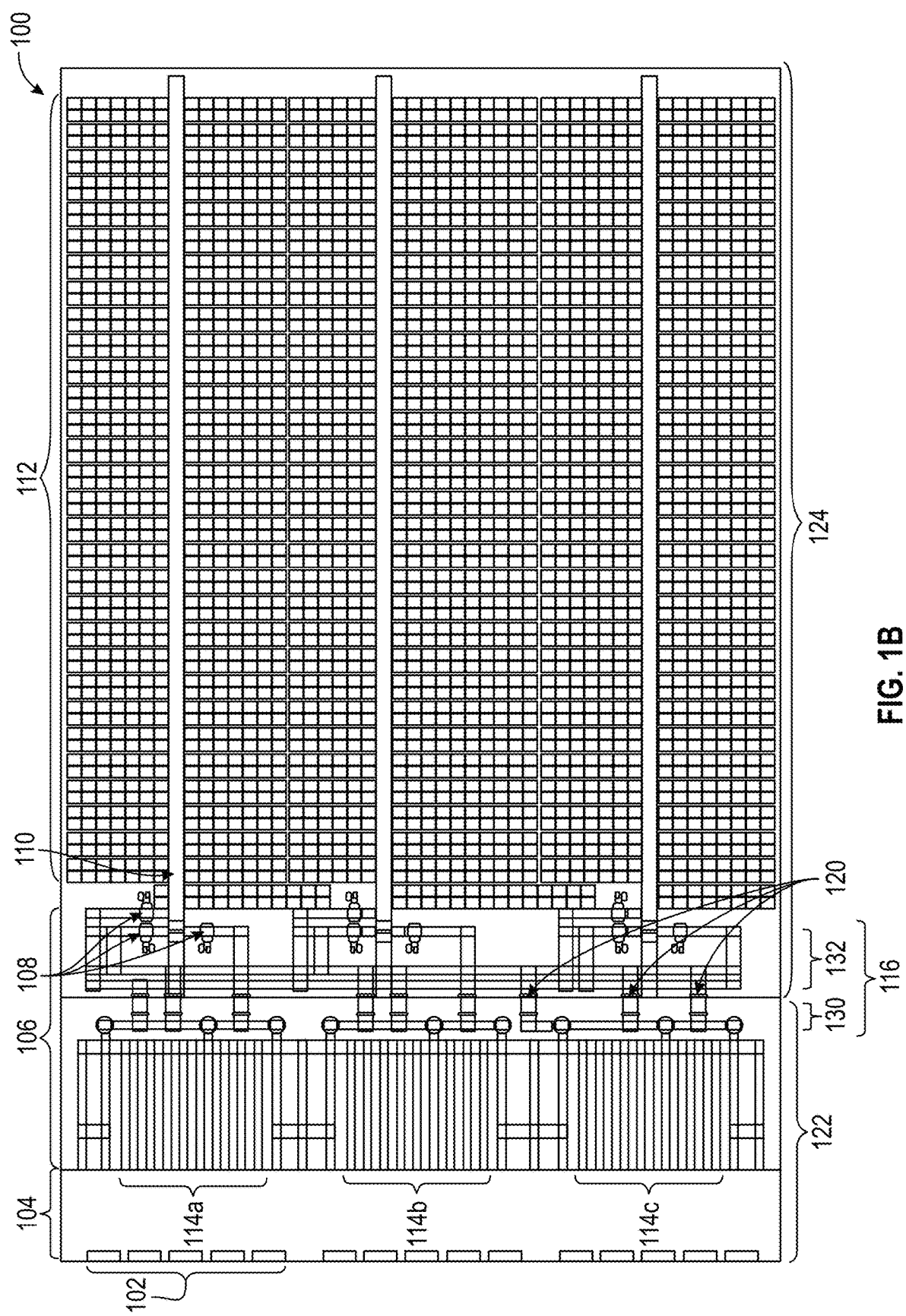

This document generally describes improvements to the configuration and design of automated warehousing systems. The improved configuration and design disclosed herein can provide a variety of improvements over conventional automated warehousing system configurations and designs. For example, the improved configurations and designs described throughout this document can increase throughput of storage at an automated warehouse by providing features that allow for the amount of time required for inbound storage items to be moved off a truck and placed into storage to be reduced and/or for the amount of time required for outbound storage items to be removed from storage and loaded onto trucks that will deliver the outbound items to other facilities to also be reduced. In another example, the improved configurations and designs can provide a more robust automated storage system that is able to provide efficient storage solutions regardless of variations in equipment availability and/or storage volume for the warehouse. For instance, the improved configurations and designs described throughout this document provide redundant structures that can accommodate for portions of the automated warehousing system being unavailable, either on account of those components being busy servicing other requests or those components being down (e.g., breaking, being repaired, maintenance). Similarly, the improved configurations and designs described throughout this document can accommodate spikes in storage volume, which may result, for example, from a warehousing system storing multiple different customer storage profiles that may have overlapping periods of storage demand.

The automated warehouse configuration and design can be optimized according to a set of parameters that define a layout and/or features of a warehousing system that handles inbound and outbound storage items. The parameters may be selected so as to optimize certain performance criteria of the warehouse. For example, a warehouse simulation computing system may model the performance of an automated warehouse under different sets of parameters that define different warehousing system configurations. The configuration of some of the automated warehousing systems disclosed herein have been determined from computer-based simulations to optimize certain performance criteria of an example warehouse.

Turning to FIGS. 1A-1F, different views are shown of an example automated warehouse 100 and its components 101-128, which can be arranged in different configurations to generate an optimized automated warehouse design. The example components 101-128 include truck doors/transport bays 102A-N that serve as an interface between trucks (e.g., cargo trailers) and the warehouse 100, and through which storage items from the trucks are loaded/unloaded. The warehouse components can further include forklifts that serve as the primary mechanism through which storage items 105 (e.g., pallets of frozen food items) are loaded/unloaded from the trucks (other mechanisms for loading/unloading the storage items can also be used). The forklifts can be manually operated and/or automatic (machine) operated. Forklifts can travel across a portion 104 of a docking area 122 of the warehouse 100, which is an open part of the warehouse 100 that permits maneuvering between the doors/bays 102 and the automated components of the warehouse 100, which include conveyors 106 (including inbound-outbound conveyor modules 114 and routing conveyor modules 116), cranes 108, and carts 110 in the storage racks 112. The cranes 108 and carts 110 can be part of an automated shuttling subsystem that transfers items between storage locations in the racks 112 and the conveyors 106. The conveyors 106 can carry storage items from the forklifts to the cranes 108, which lift the storage items to the appropriate row/level on the racks 112. The carts 110 can deliver the storage items from the cranes 108 to the assigned storage location for the storage items. Additional and/or alternative automation features are also possible. For example, rather than or in addition to cranes 108, the system may include elevators or other types lifts to raise or lower items within the warehouse 100.

Control algorithms, such as those running on a warehouse management computing system, can be used to direct and control the operation of the warehouse 100 and its components 101-128 to ensure that storage items are carried to the appropriate locations in an efficient manner.

The warehouse 100 can have one or more docking areas 122 and one or more storage areas 124. In the examples shown in FIGS. 1A-1F, the warehouse 100 has a single docking area 122 and a single storage area 124. The docking area 122 provides a space in the warehouse 100 to queue inbound storage items (e.g., storage items that have been unloaded from an incoming truck and that are to be stored in the storage racks 112 of the warehouse) and to queue outbound storage items (e.g., storage items that have been removed from the storage racks 112 and that have been assigned to be loaded onto an outgoing truck). The docking area 122 can include a row of truck doors/transport days at which delivery trucks can park and have storage items loaded onto or off of the trucks. In some warehouses, the docking area 122 also serves as an interface or buffer zone between the trucks and the storage area 124 of the warehouse. For example, in a cold-storage warehouse, the storage area 124 may be maintained at very low temperatures in order to keep inventory (e.g., storage items) on the storage racks 112 frozen. Some storage items may require the storage area 124 to be kept as low as −10 degrees Fahrenheit, although lower or higher temperatures may also be possible depending on the precise requirements of the warehouse's customers and inventory. A physical barrier, such as one or more walls, may separate the docking area 122 from the storage area 124 in order to provide different climate conditions between the docking area 122 and the storage area 124. The physical barrier may also prevent cooling loss from a refrigerated storage area 124. For example, to ensure minimal cooling loss, only a limited number of relatively small passages 120 (e.g., semi-sealed passages) may be provided in a dividing wall between the docking area 122 and storage area 124 to allow inbound storage items and/or outbound storage items to be transferred between the two areas 122, 124 (e.g., on conveyors 106).

In some implementations, the docking area 122 includes a series of inbound-outbound conveyor modules 114a-n. FIGS. 1A-1F show three such I/O conveyor modules 114a-c, by way of example. The number of I/O conveyor modules 114a-n in the docking area 122 may be selected as a function of the size of the docking area 122, storage area 124, or both, the number and arrangement of truck doors/transport bays 102A-N, and the anticipated volume of inbound and outbound delivery processing. Each I/O conveyor module 114 may be primarily assigned to handle inbound and outbound delivery processing for a respective set of n truck doors/transport bays 102A-N that are located proximate to the I/O conveyor module 114 so as to minimize the distance required for forklifts 103 to load and unload storage items between the trucks and the module 114. Preferably, for some configurations of I/O conveyor modules 114, each I/O conveyor module 114 is assigned to handle deliveries from a set of five truck doors/transport bays 102A-N. Other assignments are possible as well, such as providing a different I/O conveyor module 114 for every 2, 3, 4, 6, 7, or 8 truck doors/transport bays 102A-N.

Figure 1C:
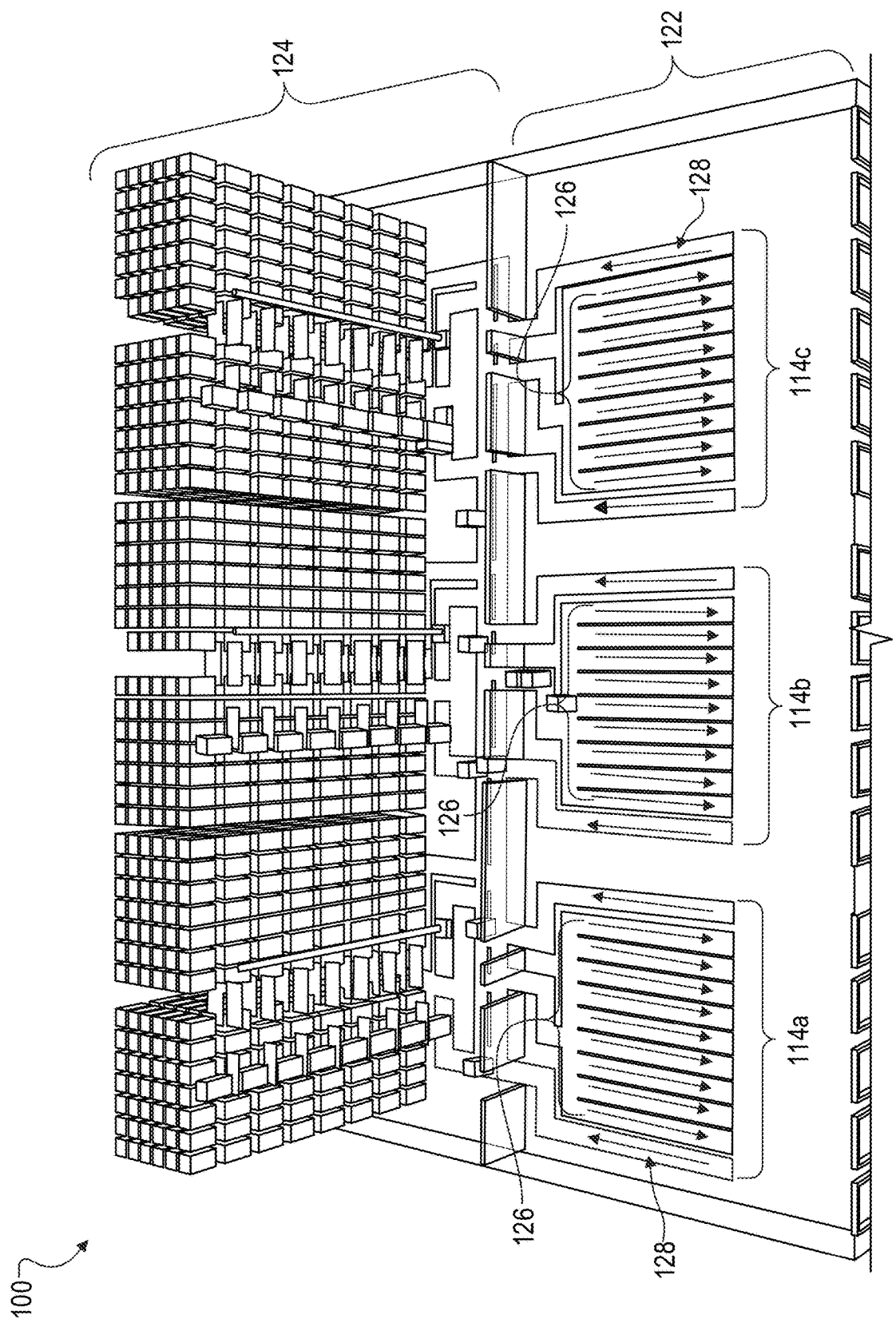

Each inbound-outbound conveyor module 114 includes a set of inbound conveyor lanes 128 and a set of outbound conveyor lanes 126. FIG. 1C shows a close-up view of the inbound and outbound lanes 126, 128 running in parallel to each other in each I/O conveyor module 114a-c. In some implementations, a total number of inbound conveyor lanes in each module 114, total number of outbound conveyor lanes in each module 114, ratio of inbound conveyor lanes to outbound conveyor lanes in each module 114, or a combination of these, may be determined so as to optimize performance factors of the warehouse 100. In the example optimized automated warehouse 100 illustrated in FIGS. 1A-1F, each I/O module 114 includes 9 outbound conveyor lanes and 2 inbound conveyor lanes 128 at the outermost positions of the module 114 (e.g., the 2 inbound lanes 128 flank a consecutive set of outbound lanes 126).

In general, the I/O modules 114 are each provided with more outbound lanes 126 than inbound lanes 128. The difference in the number of inbound and outbound lanes reflects the reality that loading trucks with outbound storage items is often a longer, less predictable process than unloading inbound storage items from the trucks. Moreover, by providing more outbound lanes, the docking area has additional capacity to queue outbound storage items in anticipation of truck arrival so that the outbound items are ready to be loaded upon truck arrival. Moreover, the system may provide fewer inbound conveyor lanes 128 than outbound conveyor lanes 126 while maintaining acceptable levels of performance (e.g., without degrading inbound item throughput rates) due to differences in how inbound storage items and outbound storage items are typically handled in the docking area 122. For example, human-operated or automated forklifts can typically carry inbound storage items directly to available inbound conveyor lanes 128 without sorting the inbound items before they are placed on the inbound lanes 128 (for instance, inbound items may simply be unloaded from a truck in a natural order according to their arrangement in the truck). The inbound conveyor lanes 128 of I/O modules 114, and inbound lanes of routing conveyors 116, may then direct inbound storage items to a crane 108, for example, to be lifted to storage in the storage racks 112 without further re-arrangement of the inbound items on the conveyors. In contrast, in order to facilitate more efficient truck loading times in the docking area 122, outbound storage items that have just been taken off the racks 112 may be arranged and re-arranged in the storage area 124 so as to direct the outbound items to specific outbound conveyor lanes 126 that are likely to minimize truck loading times. As such, more lanes (and, in some instances, longer lanes with greater numbers of pallet turning points) may be provided to carry outbound storage items in the I/O modules 114 and routing module 116 to facilitate the ability to sort and re-arrange outbound storage items. Further, the extra outbound lanes 126 may permit greater numbers of outbound items to be queued in the docking area 122 so that they can be loaded efficiently into outbound delivery trucks.

The ratio of outbound to inbound lanes in each module may be, for example, 9:2 (as shown in FIGS. 1A-1F), 2:1, 3:1, 4:1, 5:1, 6:1, or other suitable ratios. Moreover, the number of outbound lanes in each I/O conveyor module 114 may be determined, in part, based on the number of truck doors/delivery bays 102 assigned to the module 114. In general, as the number of truck doors/delivery bays 102 assigned to a given module 114 increases, the number of outbound conveyor lanes 126 in the module 114 may also be increased (e.g., direct correlation between the number of assigned truck doors/delivery bays 102 and the number of outbound delivery lanes 126). In general, a ratio of about 2 outbound delivery lanes 126 for each assigned truck door/delivery bay 102 may yield desirable performance factors. A ratio of 9:4 is shown in FIGS. 1A-1F.

The lengths of outbound conveyor lanes 126 and inbound conveyor lanes in the I/O conveyor modules 114a-c is also a factor that impacts how many storage items may be queued in the docking area 122 while waiting for truck deliveries or drop-offs. In some implementations, the lengths of all the lanes 126, 128 is substantially equal, in that they extend to a particular distance from the back wall of the docking area 122. The lanes 126, 128 should be sufficiently long to allow items to be queued in an efficient manner, but no so long as to unduly restrict the movement of forklifts 103 that load and unload storage items from trucks at the truck doors/bays 102 and the conveyor lanes 126, 128.

Each I/O receiving module 114a-c may be located near one or more passages 120 through which conveyors pass to permit transfer of storage items from the storage area 124 to the docking area 122 of the warehouse 100. Preferably, at least one inbound passage and at least one outbound passage is provided for each I/O receiving module 114a-c. By providing separate inbound and outbound passages 120, fewer hang-ups or delays may result while inbound storage items and outbound storage items are transferred between the storage area 124 and docking area 122. In some implementations, as shown in FIGS. 1A-1F, a single outbound passage 120 with conveyor connected to outbound lanes 126 may serve a particular I/O conveyor module 114, while two inbound passages 120 with conveyors connected to inbound lanes 128 also serve the particular I/O conveyor module 114. In some implementations, conveyors may link all or some of the passages 120 so that each of the passages 120 can be used as a back-up for all or some of the other passages 120. This linking can add redundancy to the system so that if, at any time, a particular passage 120 becomes unusable (e.g., due to a malfunction, a planned repair, or the throughput for the particular passage 120 becomes too low), then the system may re-direct inbound storage items and/or outbound storage items through another one of the passages 120 with little overall disruption to the flow of storage items in the warehouse. For example, if a first passage 120a that is primarily assigned to allow passage of outbound storage items to a first I/O module 114a is closed, the conveyors 106 in the system may automatically re-direct outbound storage items destined for the first I/O module 114a through a different, second passage 120b that is primarily assigned to passing outbound storage items to a second I/O module 114b. However, using conveyors 106 that link the first passage 120a to the second passage 120b, the system can ensure that outbound storage items still reach the first I/O module 114a by passing the storage items from the storage area 124 to the docking area 122 through the second passage 120b that is primarily associated with the second I/O module 114b, rather than passing the items through the first passage 120a.

The set of conveyors 106 may further include a routing conveyor module 116. The routing conveyor module 116 is configured to direct inbound and outbound storage items between I/O conveyor modules 114a-c and the crane 108 (or other component of an automatic shuttling subsystem). The routing conveyor module 116 may include conveyors 130 located in the docking area 122 and/or conveyors 132 located in the storage area 124. The routing conveyor module 116 may be configured to efficiently transport storage items carried on its conveyors from an I/O storage module 114 to a crane 108. In some implementations, the routing conveyor module 116 connects each I/O storage module 114a-c to each crane 108/automated shuttling subsystem in the storage area 124. The routing conveyor module 116 and its docking area conveyors 130 and/or its storage area conveyors 132 can also include redundant conveyor lanes such that, if one or more primary conveyor lanes becomes unusable (e.g., due to maintenance, repair, or processing delays and congestion), the redundant lanes may be used instead to maintain throughput at each of the I/O conveyor modules 114a-c.

Figure 1D:
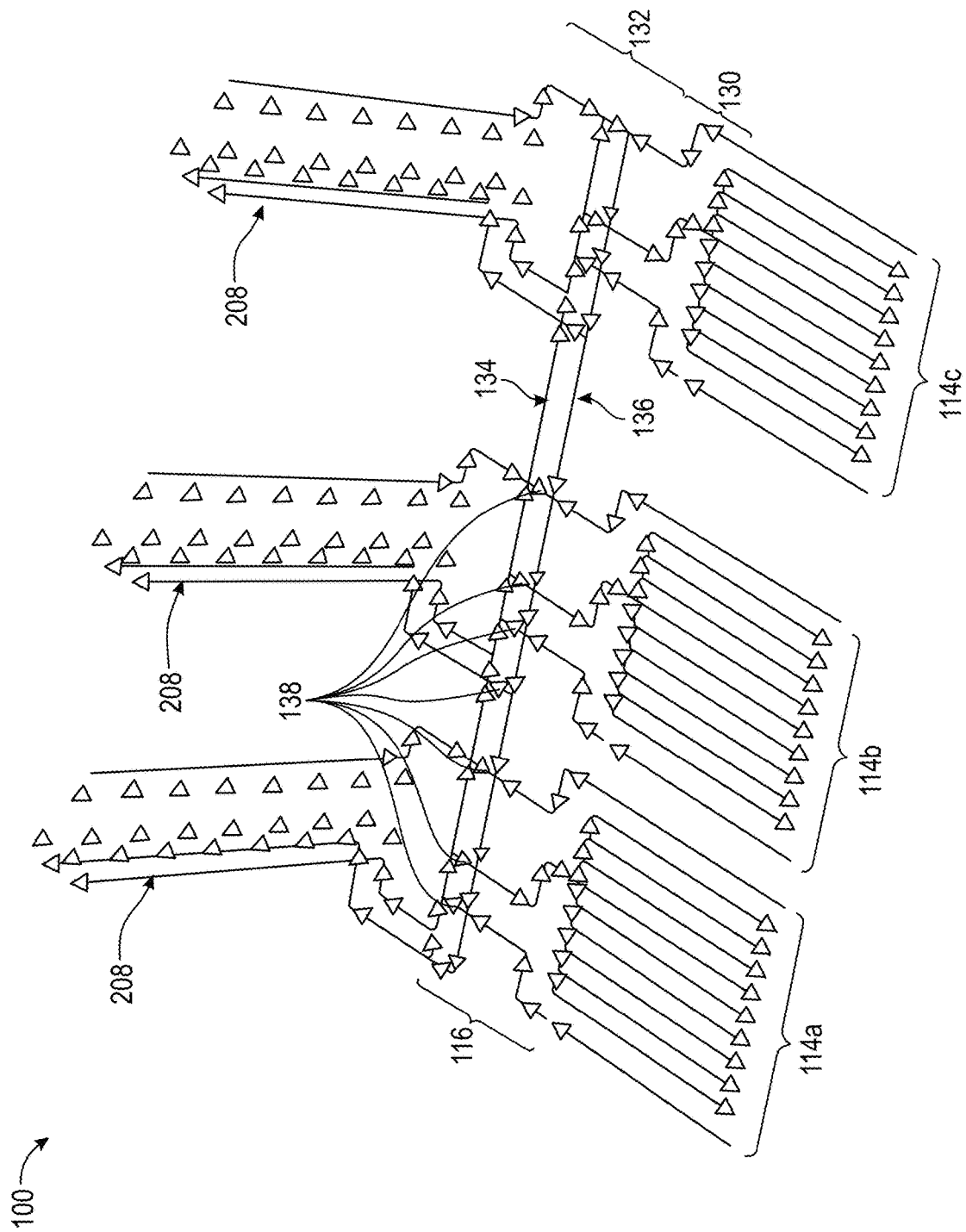
Figure 1E:
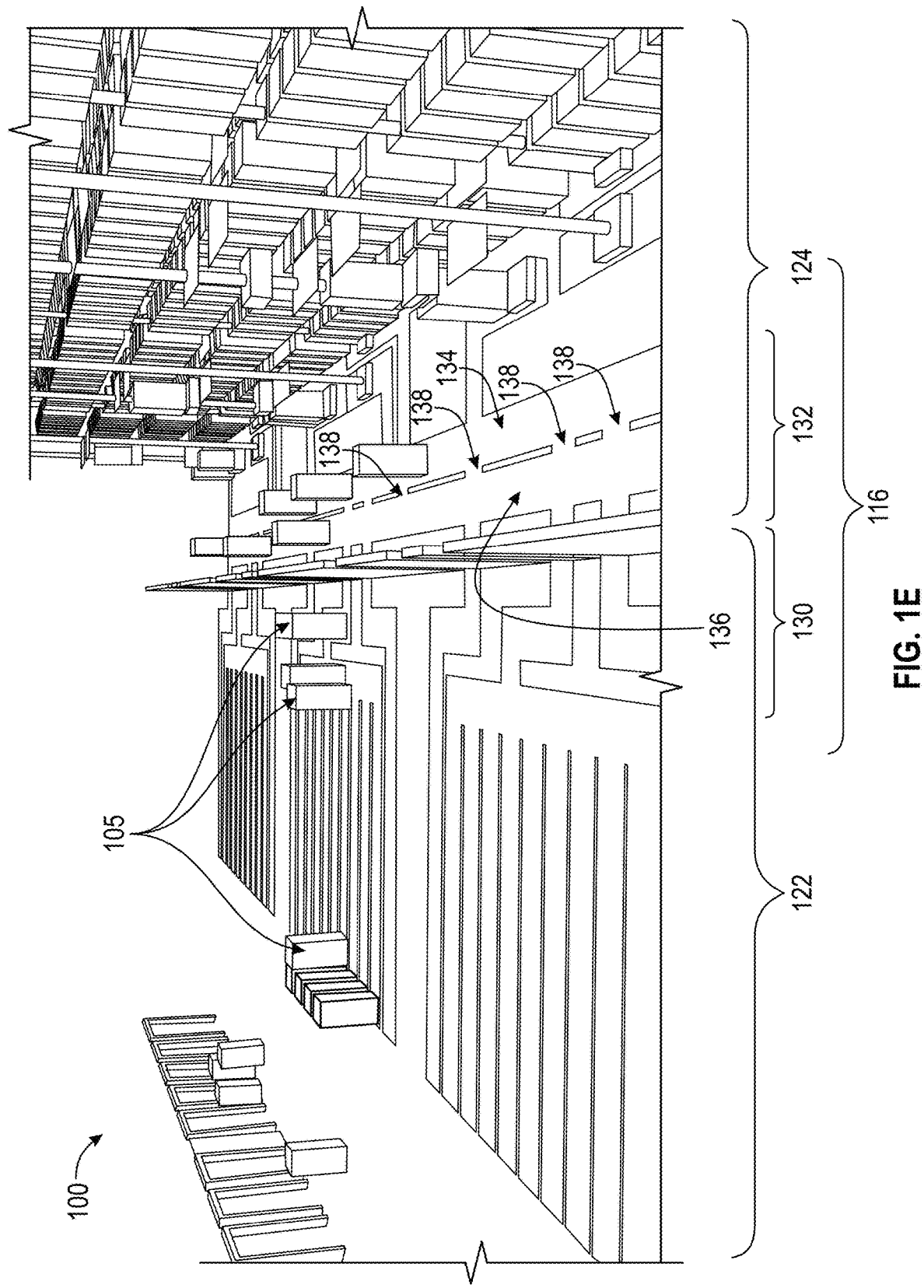
Figure 1F:
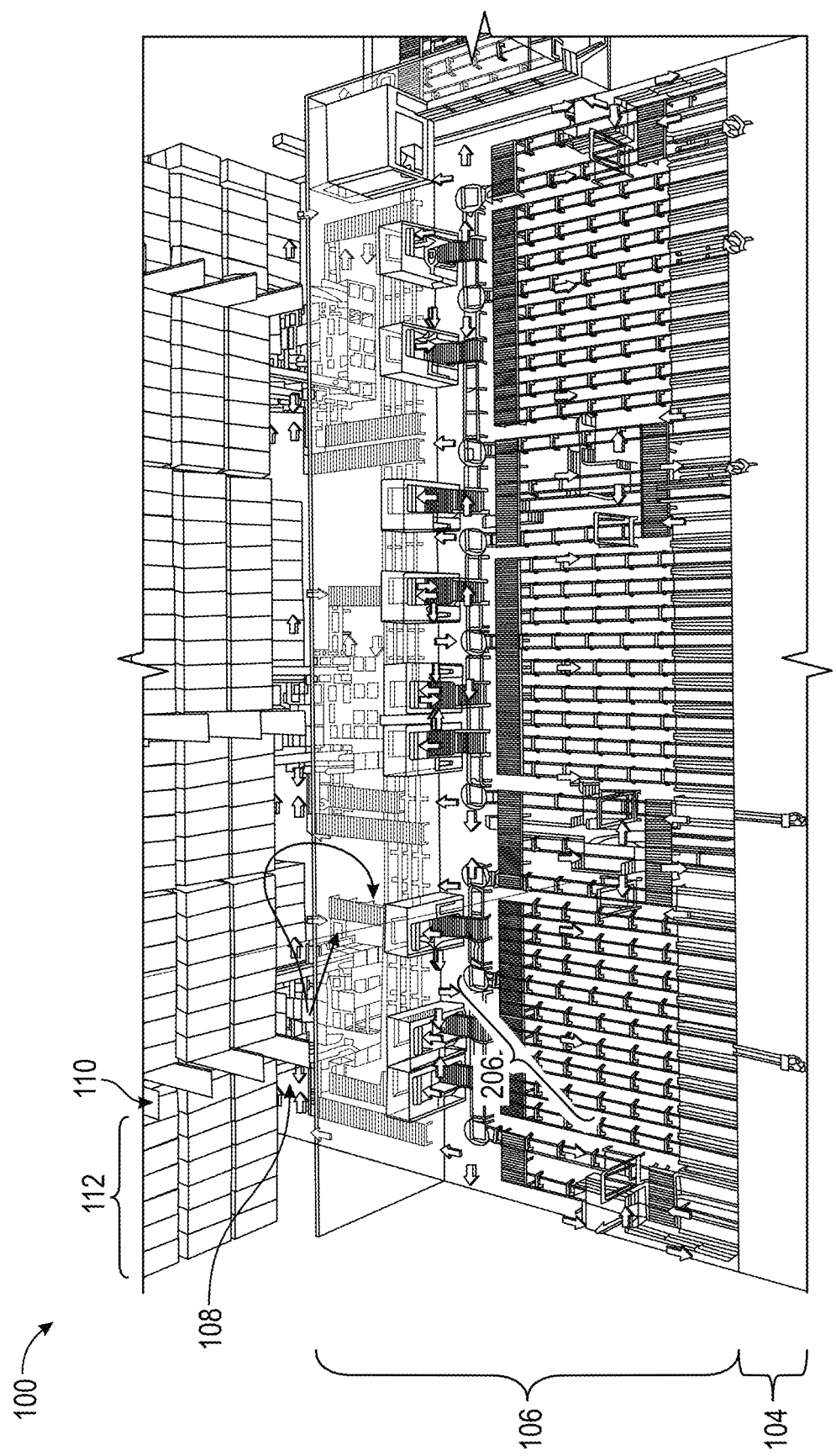

FIG. 1D, for example, shows the flow of storage items in the automated warehouse 100 and depicts storage area conveyors 132 having bi-directional redundant loops that connect each of the I/O storage modules 114a-c (both inbound and outbound) with each of the cranes 208 with redundant paths there between. Inbound and outbound storage items can be directed along a first redundant conveyor lane 134 of the storage area conveyors 132 in the routing module 116, which may be configured to transport pallets in one general direction and/or multiple directions, and can be directed along a second redundant conveyor lane 136 of the storage area conveyors 132 in the routing module 116, which may be configured to pallets in an opposite general direction and/or multiple directions. The redundant conveyor lanes 134 and 136 are connected by multiple short connecting conveyor lanes 138 that provide multiple paths between different points on the conveyors 134 and 136, and as a result, provide multiple paths between the cranes 208 and the I/O storage modules 114a-c. The connecting conveyor lanes 138 can be positioned along the conveyors 134 and 136 at locations where other conveyors from the cranes 208 and the I/O storage modules 114a-c connect to the conveyors 134 and 136. The connecting conveyor lanes 138 and their positioning along the conveyors 134 and 136 can permit for more dynamic and redundant routing of pallets, which can avoid pallet traffic jams, can allow for a greater and more dynamic use of cranes 208 and I/O storage modules 114a-c regardless of a pallets current position, and can permit for other automation components to be minimized, such as reducing the number of shuttling subsystems that are needed to process put and pull requests. As mentioned above, each lane 134 and 136 in the storage area conveyors 132 may be configured to carry items bi-directionally as needed so that storage items can still be transported between any of the three cranes 208 and any of the three I/O conveyor modules 114a-c in the event that one of the routing lanes 116 fails. The docking area conveyors 130 can, in some instances, include similar redundancies and/or common structures used across multiple directional lanes of conveyors.

The redundant loop of storage area conveyors 132, provided by the combination of lanes 134 and 136, and the connecting lanes 138, can permit for the ratio of shuttling subsystems to conveyors leading into the storage area and/or doors into the storage area to be reduced. For example, by providing the redundant loop of storage area conveyors 132, the ratio of shuttling subsystems can be reduced, for example by ⅓ (or more) to provide fewer shuttle carts per module and to increase the number of outbound lanes per shuttle.

In some implementations, the routing conveyors 116, including docking area conveyors 130 and storage area conveyors 132, are configured to minimize the amount of time that storage items are located in the docking area 122 rather than the storage area 124. For example, in cold-storage facilities, the storage area 124 may be refrigerated to cool temperatures (e.g., −10 degrees Fahrenheit or other temperatures) so as to keep inventory stored in the storage area frozen. In contrast, the docking area 122 may not be cooled or may be cooled to a lesser extent than the storage area 124. In order to prevent frozen storage items from thawing while being processed and moved in and out of storage, the system may include features that reduce the amount of time that the frozen storage items are located in non-refrigerated/non-frozen areas such as the docking area 122. Accordingly, the conveyors may be configured to sort and arrange outbound storage items in the refrigerated storage area 124 rather than the docking area 122. After outbound storage items have been sorted (e.g., to optimize truck load times in the docking area 122), the items may be directed to an appropriate outbound conveyor lane of an I/O module 114 in the docking area 122. Similarly, inbound storage items may be taken directly, or with minimal delay, out of the docking area 122 and into the storage area 124 for further processing, so as to reduce the time the inbound items spend in the docking area 122.

In some implementations, a staging area 118 for pallets that are not involved in the normal flow of inbound and outbound processing may be provided outside of the docking area 122. For example, rejected pallets that cannot be placed in the storage racks 112 due to damage or other reasons may be temporarily stored in the staging area 118. The staging area 118 is separated from the docking area 122 so as to maximize the available use of space in the docking area 122 for routine inbound and outbound processing. For example, by removing the staging area 118 from the docking area 122, additional space is made available for inbound conveyor lanes 128 and outbound conveyor lanes 126 in the docking area 122. Computer models and simulations have shown that, in some instances where the expected frequency of rejected pallets is relatively low, a net benefit results from maximizing the use of space in the docking area 122 for I/O modules 114 rather than dedicating space in the docking area 122 to a staging area 118. In some implementations, each I/O module 114a-c includes a single reject conveyor lane in addition to the outbound conveyor lanes 126 and inbound conveyor lanes 126. Pallets or other inbound storage items that are rejected as not being in suitable condition for storage in the storage area 124 may be re-routed from the inbound conveyor lanes 126 of an I/O module 114 to the reject lane of the I/O module 114. A forklift, for example, may then remove the rejected storage items from the reject conveyor lane and transport the rejected items to staging area 118, away from the docking area 122. Although computer simulations have shown that a single reject conveyor lane per I/O module 114 is adequate when the expected frequency of rejected storage items is sufficiently low, in other implementations, two or more reject conveyor lanes may be provided in each I/O module 114, especially when the rate of rejected storage items is expected to be higher.

Figure 2:
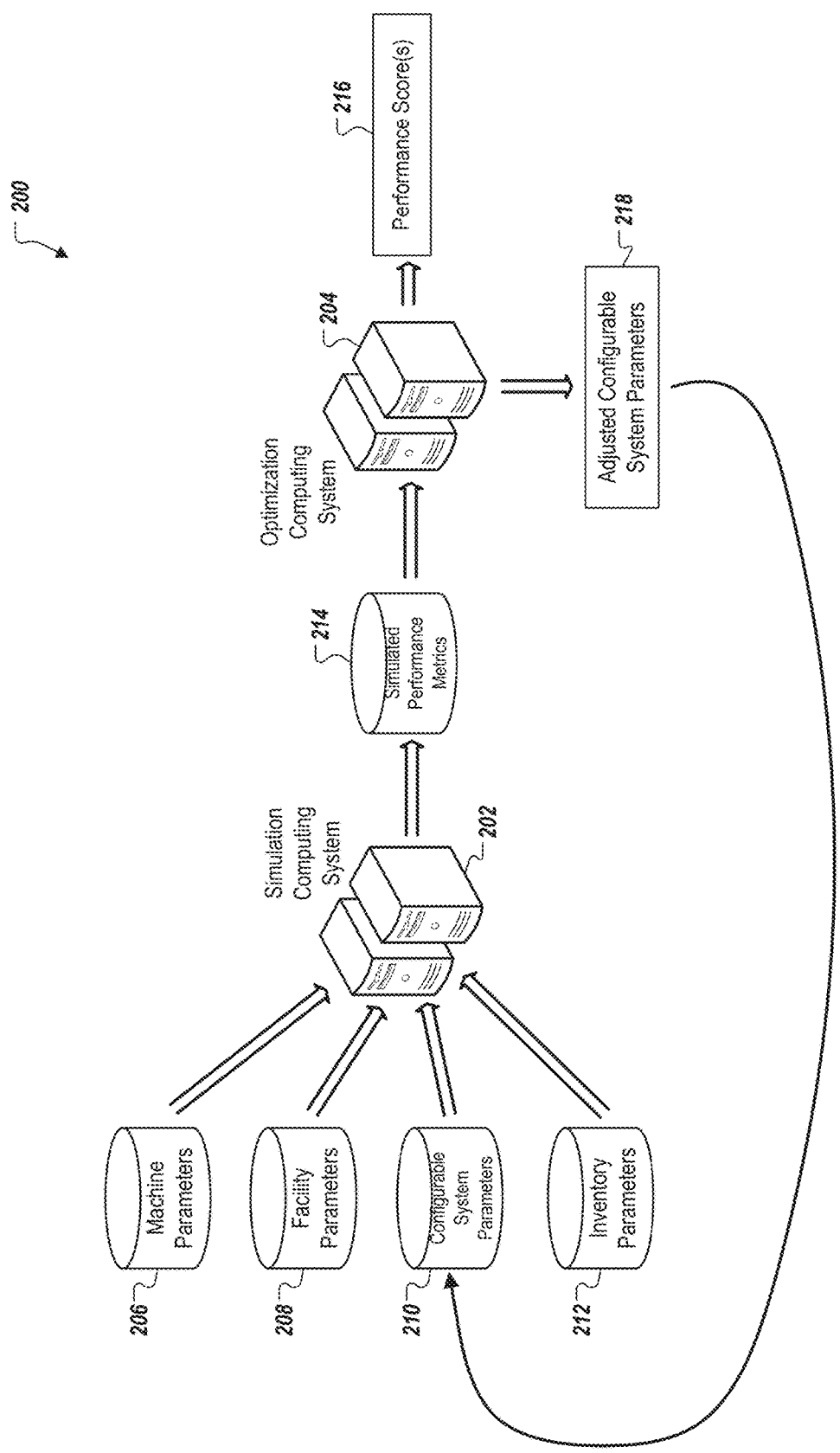
FIG. 2 conceptually illustrates a computing environment for determining parameters that define the configuration of an automated warehousing system. The parameters may be determined so as to optimize one or more performance metrics of the warehouse.

FIG. 2 conceptually illustrates a computing environment 200 for determining parameters that define the configuration of an optimized automated warehousing system. The parameters may be determined so as to optimize one or more performance metrics of the warehouse. A simulation computing system 202, including one or more computers in one or more locations, may process a set of inputs 206-212 to generate simulated performance metrics 214 of an automated warehouse. The set of inputs that the simulation system 202 processes can include machine parameters 206, facility parameters 208, configurable system parameters 210, and inventory parameters 212. The machine parameters 206 may model the performance of automated features of the warehouse 100 (e.g., acceleration, speed, delay, capacity). The facility parameters 208 may model physical characteristics of the warehouse (e.g., warehouse dimensions and sizes of docking area 122 and storage area 124). The inventory parameters 110 may model the use of the warehouse 100 (e.g., modeling the size and frequency of inventory stored at the facility over time). In general, the parameters 206, 210, and 212 may define fixed characteristics of the warehouse 100 or other parameters that indicate a working environment for an automated warehousing system installed in the warehouse 100. In contrast, the configurable system parameters 210 may model the configuration of the automated warehousing system itself (e.g., total number and arrangement of inbound-outbound conveyor modules, total number and arrangement of truck doors/transport bays, total number and arrangement of inbound conveyor lanes and outbound conveyor lanes per I/O module, length/size of inbound and outbound conveyor lanes, total number and arrangement of conveyor passages between storage area and docking area, configuration of a routing conveyor module, and the total number and arrangement of redundant lanes in the routing conveyor module). In some implementations, the configurable system parameters 210 further indicate ratios between any of the above-listed quantities, where the ratios represent a constraint for a particular warehousing system configuration.

The simulation system 202 processes the inputs 206-212 to generate simulated performance metrics 214. The simulated performance metrics 214 indicate performance factors of the automated warehouse given the set of inputs 206-212 provided to the simulation system 202. Some example performance metrics 214 include throughput of inbound storage items, throughput of outbound storage items, truck delay times (e.g., how long a truck with an inbound delivery must wait before unloading begins or is completed), storage times (e.g., how long between a time when an inbound storage item is unloaded from a truck to a time the item is finally placed into storage in the storage racks), and load times (e.g., how long is required for an outbound truck to be completely loaded while parked at a transport bay).

Once the simulation system 202 has completed a simulation and performance metrics 214 have been generated, an optimization computing system 204 (which may be implemented on the same or different computers as the simulation system 202) generates a performance score 216, e.g., using an optimization function that processes a weighted combination of the simulated performance metrics 214. The system 204 may also generate adjusted configurable system parameters 218 and provide the adjusted parameters 218 as updated configurable system parameters for a new simulation. The simulation system 202 may then run a new simulation according to the adjusted parameters and the optimization system 204 may evaluate the results of the simulation to determine an updated performance score 216. If the score 216 improved, for example, then the adjusted parameters 218 may be accepted. If the score 216 did not improve, for example, then the adjusted parameters 218 may be rejected. In this manner, using an iterative process, the simulation and optimization computing systems 202, 204 may determine parameters that define an optimized configuration for an automated warehouse, such as the configuration disclosed with respect to FIGS. 1A-1F.

Figure 3:
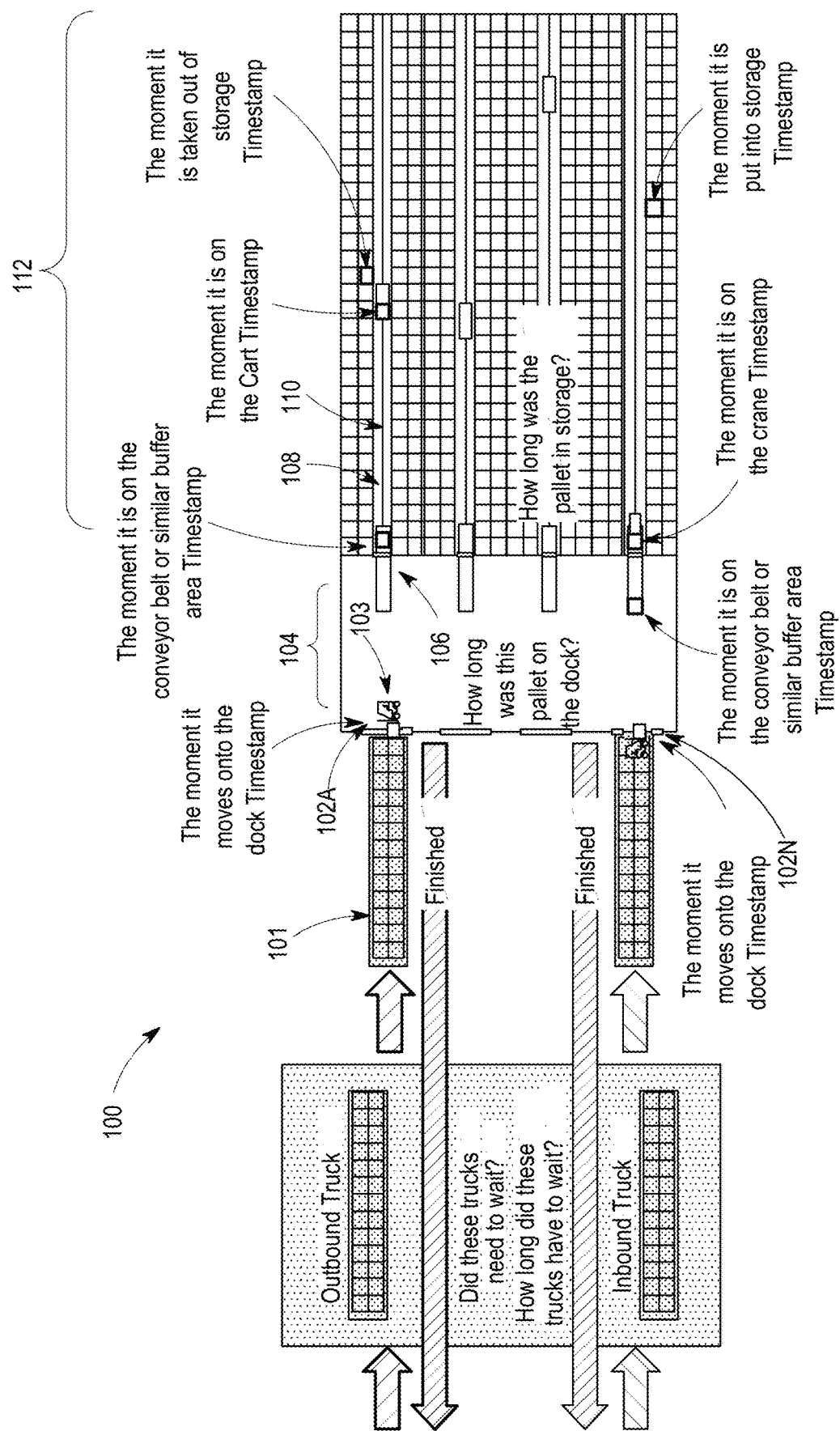
FIG. 3 is a diagram showing an example top down view of an automated warehouse. The diagram includes annotations identifying some example performance factors/metrics of the warehouse.

Referring to FIG. 3, an example top down view of the warehouse 100 from FIGS. 1A-1F is presented with annotations identifying different performance factors for an automated warehouse as they relate to the warehouse components 101-128. Information for determining these performance factors can be recorded during simulations, such as recording timestamps when trucks and/or storage items arrive at various checkpoints within the warehouse 100. In some implementations, these performance factors may be included among the simulated performance metrics 214 and processed by the optimization computing system 204 during a process for optimizing a warehouse configuration.

Regarding truck performance, the amount of time that trucks have to wait to be docked at the doors/bays 102 is a first performance factor that can be analyzed. For example, if all of the doors/bays 102 are occupied when a truck 101 arrives at the warehouse 100, that truck will have to wait until one of the doors/bays 102 opens up. This waiting is an inefficiency that the simulation can identify. The waiting can be indicated, for example, by a first record indicating a time when the truck 101 was at the warehouse 100 and ready to be docked (a first example checkpoint) and a second record indicating a later time when the truck 101 was able to be docked (a second example checkpoint). The difference between these two times is the wait time for the truck 101.

The truck 101 docking at the door/bay 102 can be a checkpoint that is recorded and, in addition to being used to determine wait times, can be used to determine an amount of time it takes for the truck 101 to be unloaded and/or loaded with storage items. The truck 101 leaving the door/bay 102 can be another checkpoint that is recorded to bookend these time intervals.

Regarding individual storage item performance in the automated warehouse 100, the forklift 103 unloading a storage item from the truck 101 can be a checkpoint that is recorded to start a time period for (a) the time duration for the storage item to travel across the dock 104 to the conveyors 106 and (b) the overall time duration for the storage item to travel from the truck 101 to its ultimate storage location in the racks 112. Once the forklift 103 delivering the storage item to a conveyor 106 can be another checkpoint that is recorded, which can be used to determine (a) the ending time for the storage item to travel across the dock 104 to the conveyors 106 and (b) the time for the storage item to travel along the conveyors 106. Other checkpoints that prompt records being created for the storage item can include the storage item arriving at the crane 108, the storage item arriving at the cart 110, and the storage item arriving at its storage location in the rack 112. These records corresponding to the storage item arriving at various locations along its path from the truck 101 to a storage location in the racks 112 can be used to determine one or more time intervals for the storage item's movement through the warehouse 100, which can indicate performance of the warehouse 100. For example, the longer it takes for a storage item to arrive at its storage location, the more inefficient the automated warehouse design is at handling the historic/expected inventory for the warehouse 100.

Similar records can be generated as storage items are retrieved from the storage locations in the racks 112. For example, records can be generated when a request for the storage item is generated by the system, when the cart 110 retrieves the storage item from its storage location, when the storage item arrives at the crane 108, when the storage item arrives at the conveyors 106, when the forklift 103 retrieves the storage item from the conveyor 106, and when the forklift 103 loads the storage item onto the truck 101. Additional and/or alternative checkpoints and records can be generated.

Figure 4:
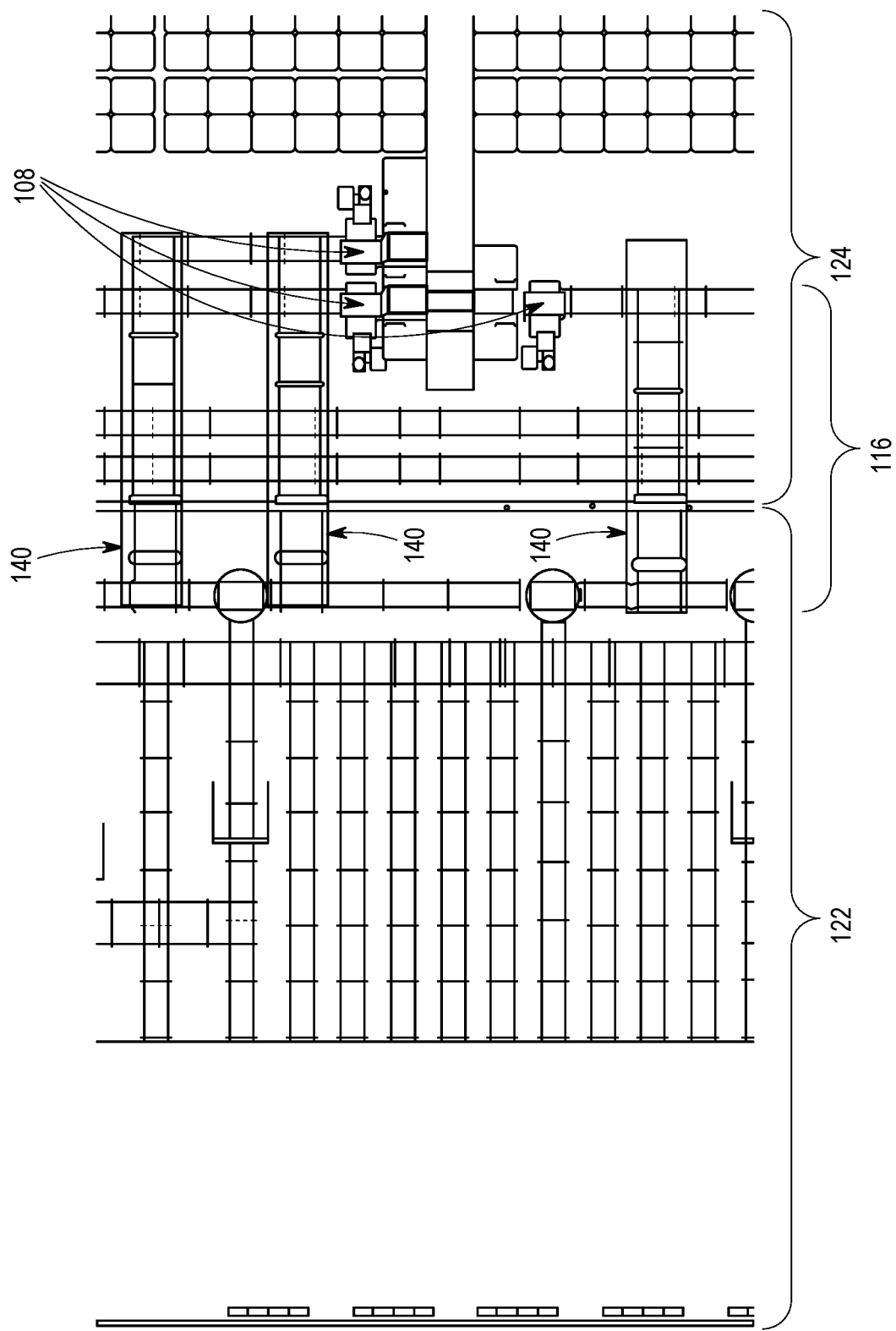
FIG. 4 is a conceptual diagram of a portion of an automated warehouse that includes a set of direct-transport conveyors extending between the docking and storage areas of the warehouse.

FIG. 4 depicts a further enhancement for a conveyor system in an automated warehouse 100. In particular, in this example, the warehouse 100 includes a set of direct-transport conveyors 140. Each direct-transport conveyor 140 is configured to run either (i) directly from a conveyor in the docking area 122 to a lift 108 in the storage area 124, or (ii) directly from a conveyor in the docking area 122 to an end portion of the routing conveyor module 116 nearest a lift 108 where pallets are queued immediately before being loaded on the lift 108 or immediately after removal from the lift 108. For instance, as shown in the figure, three direct-transport conveyors 140 run straight from the backside of the docking area 122 to an end portion of routing conveyor module 116 at adjacent positions near the lifts 108 in storage area 124. The direct-transport conveyors 140 provide an option for highly efficient routing of pallets between the docking area 122 and storage area 124 by bypassing intermediate portions of the routing conveyor module 116 (e.g., redundant lanes 134, 136). Simulations have shown that pallet throughput and warehouse operating efficiency are improved by the addition of direct-transport conveyors 140. For example, situations may arise during the normal operation of a warehouse 100 where pallets need to be moved directly from the racks 112 to a truck or vice versa. The direct-transport conveyors 140 can facilitate the direct movement from the lifts 108 to the docking area 122, or from the docking area 122 to the lifts 108.

In some implementations, the direct-transport conveyors 140 are optimized to meet the demands and configuration of the particular warehouse 100 in which they are installed. For example, if the warehouse 100 includes crossing lanes that would interfere with direct-transport conveyors 140 (e.g., redundant conveyor lanes 134, 136), then the direct-transport conveyors 140 may vary in height to ride above or below the other conveyors without interference. In other implementations, the direct-transport conveyors 140 may intersect all or some crossing lanes in its path. At each intersection, pallets may be re-directed off the direct-transport conveyor 140 to the crossing lane, or onto the direct-transport conveyor 140 from the crossing lane. In this way, pallets may be advanced from a waiting position in the queue on an intermediate portion of the routing conveyor module 140 to the lift 108 in a maneuver that may not otherwise be available without the direct-transport conveyor 140.

Each direct-transport conveyor 140 passes through the dividing wall between the docking area 122 and the storage area 124. The direct-transport conveyors 140 may share the same passages as 120 as other conveyors in module 116, or may be provided with separate passages dedicated to direct transport. The number of direct-transport conveyors 140 may vary in different designs. In some implementations, each I/O conveyor module 114 in the docking area 122 includes its own direct-transport conveyor 140. In some implementations, each lift 108 in the storage area 124 includes its own direct-transport conveyor 140. In some implementations, the warehouse 100 may include fewer direct-transport conveyors 140 than I/O conveyor modules 114 or lifts 108.

Figure 5:
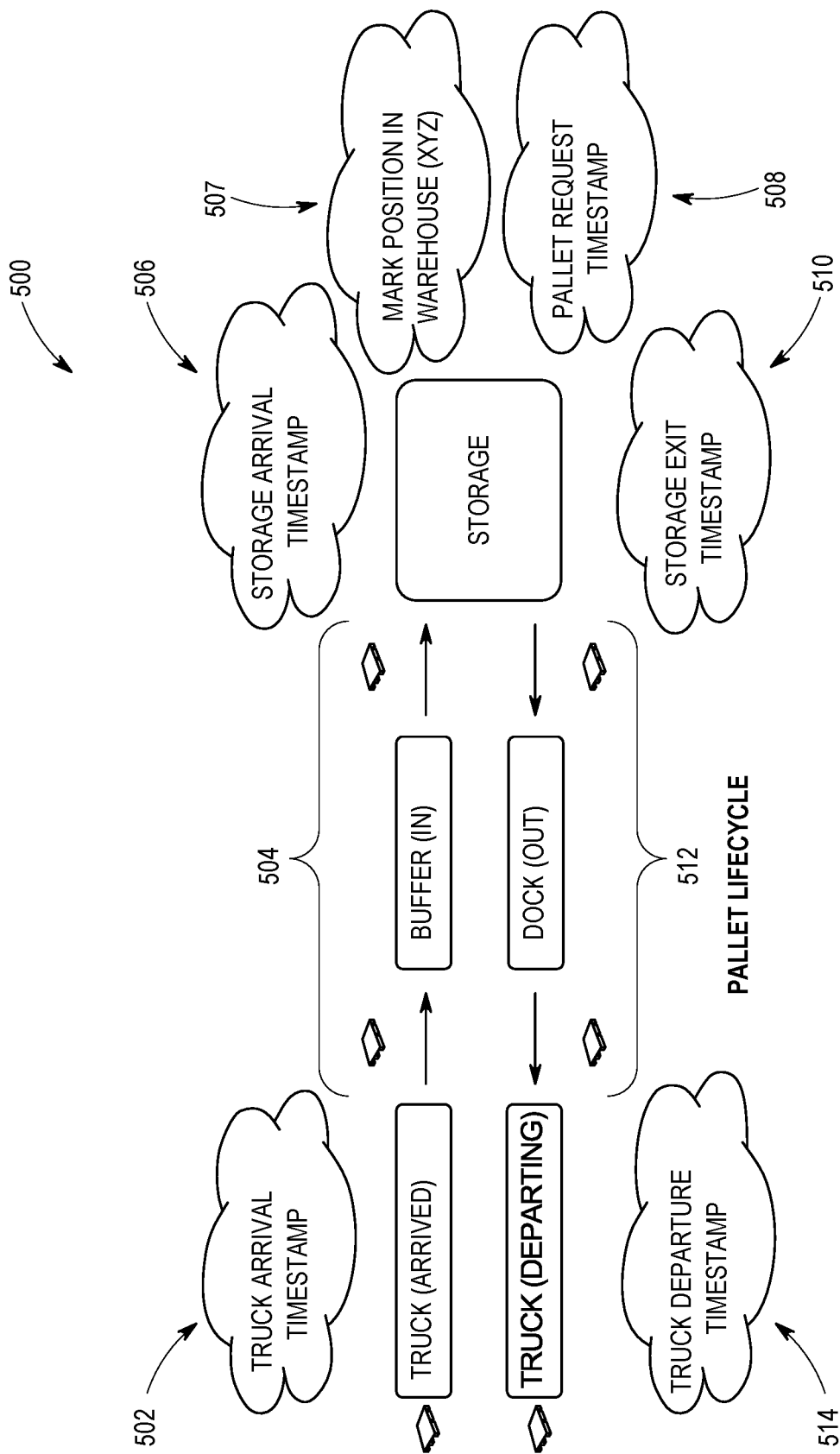
FIG. 5 is a conceptual diagram depicting automated warehousing actions that are simulated and data that is recorded as part of the simulation, which may be used to determine performance factors/metrics to influence the configuration parameters of an automated warehouse.

FIG. 5 is a conceptual diagram 500 depicting automated warehousing actions that are simulated and data that is recorded as part of the simulation. The simulation and data recording that is depicted can be performed, for example, by the system 500 using the technique 500, as described above. Other systems and techniques can also be used.

A first action 502 that is simulated and recorded is a truck arriving at the warehouse. The record generated for this can be a timestamp in the simulation for the trucks arrival. A next action 504 is the transport of each pallet within the truck to storage locations within the warehouse that are designated for each pallet. This action can be simulated using the automated warehousing components in the warehouse automation design that is being tested, and the duration of this action can be indicated by the difference between a timestamp when the pallet left the truck to when it arrived at the storage location, which is a next action 506. The storage location (position) for the pallet can be marked 507, which can conclude the place simulation for a pallet.

Once placed at a storage location, a simulation of the pallet being retrieved from that location can be performed. Starting with action 508, the request for the pallet issued to the system can be recorded with a timestamp. The next action 510 is the actual (simulated) retrieval and exit of the pallet out of the storage racks, which causes the pallet to travel over the automated components to the departing truck, as indicated by action 512. The final action 514 in retrieving the pallet is loading it onto the departing truck, which can be additionally be accompanied by a corresponding timestamp.

The table below details the example historical inventory data ("real data") that is used to drive the simulation and the example actions that are simulated, such as those described above with regard to FIG. 5:

servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those

TABLE 1

| From Real Data: | Simulated Actions (Listed major actions, but not limited to): |
|---|---|
| Trucks time into the facility | The time the pallet gets into the facility |
| Trucks ID's | The time for pallets on a conveyor or other mechnacal equiptment |
| The amount of pallets in the truck | Time within the storage area |
| The pallets SKUs | The time it was requested (as given by outbound truck time) |
| Inbound or Outbound | Time it took to get out of the facility |
| | The time the truck pulled out of the dock |

Figure 6:
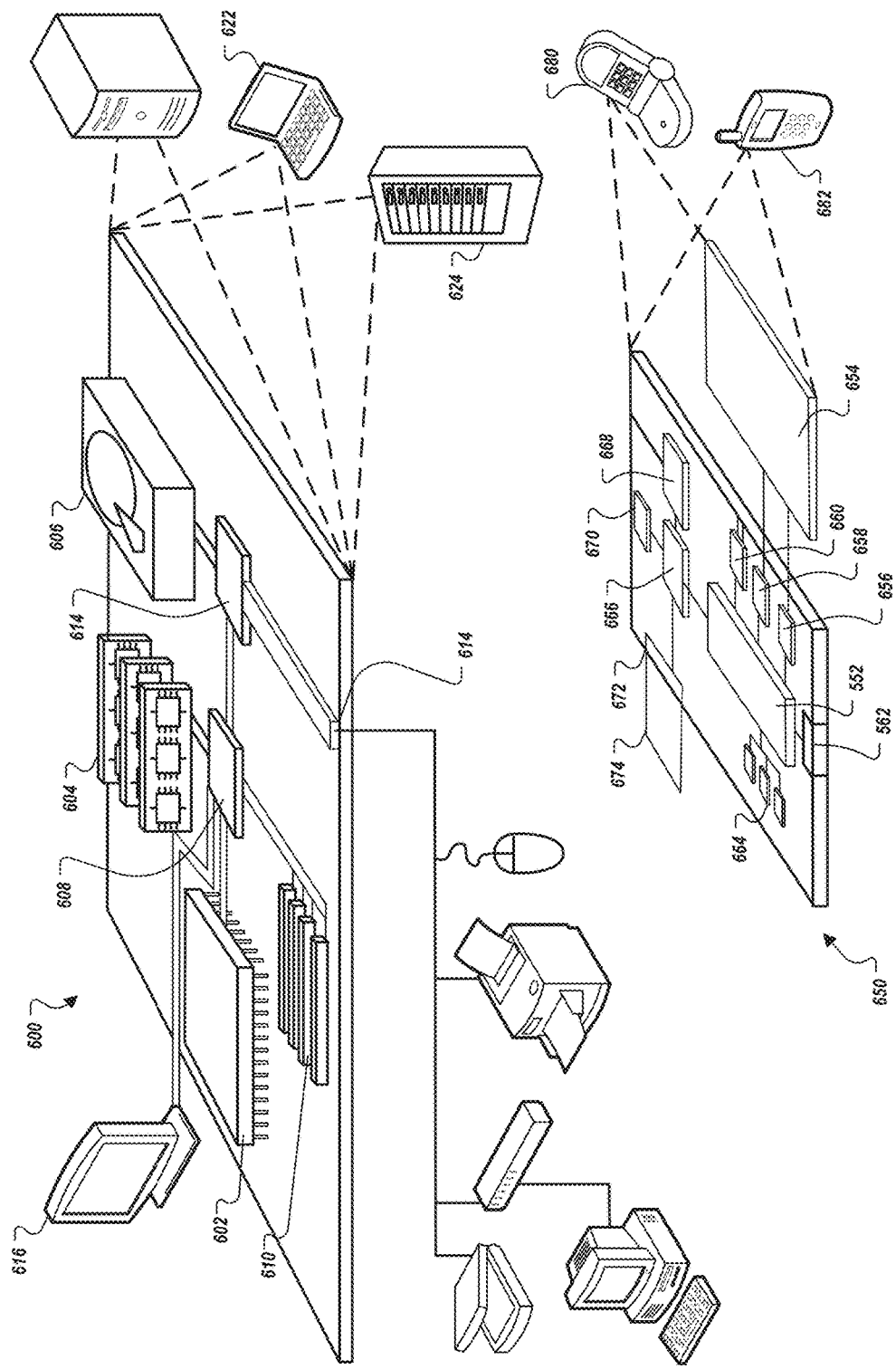
FIG. 6 is a block diagram of example computer apparatus that may be used to implement the computer-based systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. An automated warehousing system for transporting storage items between a docking area of a warehouse and a storage area of the warehouse, the warehousing system comprising: a plurality of inbound-outbound conveyor modules configured to be located in the docking area of the warehouse, each inbound-outbound conveyor module including:
   (i) a set of inbound conveyor lanes configured to carry inbound storage items to the docking area of the warehouse, and
   (ii) a set of outbound conveyor lanes configured to carry outbound storage items that have delivered from the docking area of the warehouse to pick-up positions in the docking area of the warehouse, a plurality of doors, each of the plurality of inbound-outbound conveyor modules being associated with at least one of the plurality of doors,
   wherein the plurality of doors are configured to be located between the docking area of the warehouse and the storage area of the warehouse,
   wherein the at least one door is configured to provide access to at least one of the set of inbound conveyor lanes and at least one of the set of outbound conveyor lanes of an inbound-outbound conveyor module amongst the plurality of inbound-outbound conveyor modules such that storage items are transferred between the docking area and the storage area of the warehouse; and
   at least one crane configured to be located in the storage area of the warehouse, wherein the at least one crane is configured to transport
   (i) inbound storage items between the at least one inbound conveyor lane and respective storage positions of storage racks located in the storage area of the warehouse and
   (ii) outbound storage items between respective storage positions of the storage racks located in the storage area of the warehouse and the at least one outbound conveyor lane.

2. The automated warehousing system of claim 1, wherein a ratio of outbound conveyor lanes to inbound conveyor lanes is at least twice a total quantity of inbound conveyor lanes per inbound-outbound conveyor module.

3. The automated warehousing system of claim 1, wherein at least one of the plurality of inbound-outbound conveyor modules comprises 24 outbound conveyor lanes for every 2 inbound conveyor lanes.

4. The automated warehousing system of claim 1, wherein a ratio of cranes to doors inside the storage area is 1:2.

5. The automated warehousing system of claim 1, wherein a ratio of cranes to doors inside the storage area is 1:4.

6. The automated warehousing system of claim 1, comprising multiple inbound-outbound conveyor modules located in the docking area of the warehouse.

7. The automated warehousing system of claim 1, wherein the docking area of the warehouse is separated from the storage area of the warehouse by a wall to substantially isolate the docking area from the storage area, wherein the wall includes the at least one door.

8. The automated warehousing system of claim 1, wherein:
   the docking area includes a plurality of transport bays, each transport bay configured to receive a respective vehicle for outbound storage item deliveries or inbound storage item deliveries; and
   a total number of outbound conveyor lanes among the sets of outbound conveyor lanes in the one or more inbound-outbound conveyor modules is greater than a total number of transport bays in the plurality of transport bays of the docking area.

9. The automated warehousing system of claim 1, wherein the set of inbound conveyor lanes and the set of outbound conveyor lanes are configured to be arranged in parallel to each other in running across a respective portion of the docking area.

10. The automated warehousing system of claim 1, wherein, for each inbound-outbound conveyor module, the respective inbound conveyor lanes in the set of inbound conveyor lanes and the respective outbound conveyor lanes in the set of outbound conveyor lanes have substantially a same length.

11. The automated warehousing system of claim 1, wherein the at least one door is configured to service a first crane and a second crane inside the storage area.

12. The automated warehousing system of claim 11, the warehousing system further comprising a routing conveyor module configured to be located in the storage area, the routing conveyor module comprising (i) a first conveyor loop configured to service the first crane in the storage area and (ii) a second conveyor loop configured to service the second crane in the storage area.

13. The automated warehousing system of claim 12, wherein the routing conveyor module is configured to (i) receive the inbound storage items from the at least one inbound conveyor lane in the storage area and (ii) provide the outbound storage items to the at least one outbound conveyor lane in the storage area.

14. The automated warehousing system of claim 1, further comprising a warehouse management computing system that is configured to:
obtain a storage item profile that indicates a distribution of different types of storage items that are anticipated to be stored on storage racks in the storage area of the warehouse over a future period of time;
determine, based at least on the storage item profile, a configuration of the plurality of inbound-outbound conveyor modules that optimizes one or more criteria; and
generate information for presentation to a user of the warehouse management computing system that represents the determined configuration of the plurality of inbound-outbound conveyor modules.

15. The automated warehousing system of claim 14, wherein the configuration of the plurality of inbound-outbound conveyor modules indicates, for each inbound-outbound conveyor module, at least one of a total number of inbound conveyor lanes, a total number of outbound conveyor lanes, a length of the inbound conveyor lanes, a length of the outbound conveyor lanes, and a ratio of the total number of outbound conveyor lanes to the total number of inbound conveyor lanes.

16. The automated warehousing system of claim 14, wherein the one or more criteria that are optimized in determining the configuration of the plurality of inbound-outbound conveyor modules include at least one of a throughput of inbound storage items and a throughput of outbound storage items.

17. The automated warehousing system of claim 1, the warehousing system further comprising a routing conveyor module configured to be located in the storage area, wherein the routing conveyor module services the at least one crane.

18. The automated warehousing system of claim 17, wherein the routing conveyor module comprises a conveyor loop configured to provide a common ingress pathway and a common egress pathway for the at least one crane in the storage area.

19. The automated warehousing system of claim 17, the warehousing system further comprising at least one multi-directional conveyor loop configured to be located in the storage area and to connect the sets of inbound conveyor lanes and the sets of outbound conveyor lanes with the at least one crane.

20. The automated warehousing system of claim 17, wherein the routing conveyor module includes one or more conveyors that connect the plurality of inbound-outbound conveyor modules such that a given storage item can be continuously transferred within the storage area from any of the plurality of inbound-outbound conveyor modules to another of the plurality of inbound-outbound conveyor modules.

* * * * *